(12) United States Patent
Lu et al.

(10) Patent No.: US 10,218,230 B2
(45) Date of Patent: Feb. 26, 2019

(54) LOW-VOLTAGE DIRECT CURRENT MOTOR

(71) Applicant: Johnson Electric International AG, Murten (CH)

(72) Inventors: Ming Cen Lu, Shenzhen (CN); Chi Keung Law, Hong Kong (CN); Ngai Ming Leung, Hong Kong (CN)

(73) Assignee: Johnson Electric International AG, Murten (CH)

( * ) Notice: Subject to any disclaimer, the term of this patent is extended or adjusted under 35 U.S.C. 154(b) by 191 days.

(21) Appl. No.: 15/185,492

(22) Filed: Jun. 17, 2016

(65) Prior Publication Data
US 2016/0372981 A1   Dec. 22, 2016

(30) Foreign Application Priority Data

Jun. 19, 2015   (CN) .......................... 2015 1 0345658
Apr. 19, 2016   (CN) .......................... 2016 1 0244005

(51) Int. Cl.
| *H02K 1/02*  | (2006.01) |
| *H02K 1/17*  | (2006.01) |
| *H02K 23/04* | (2006.01) |

(52) U.S. Cl.
CPC ............... *H02K 1/02* (2013.01); *H02K 23/04* (2013.01); *H02K 1/17* (2013.01); *H02K 2213/03* (2013.01)

(58) Field of Classification Search
CPC   H02K 1/02; H02K 1/17; H02K 23/04; H02K 2213/03
USPC .................................................... 310/154.01
IPC ................................................ H02K 1/02,1/17
See application file for complete search history.

(56) References Cited

U.S. PATENT DOCUMENTS

| 2,177,472    | A  | * | 10/1939 | Barrett ................... H02K 1/17 310/154.37 |
| 4,445,059    | A  | * | 4/1984  | Corbach ................ H02K 23/04 310/154.28 |
| 6,376,963    | B1 | * | 4/2002  | Furuya ............... H02K 15/0018 310/214 |
| 6,568,066    | B2 | * | 5/2003  | Furuya ............... H02K 15/0018 29/598 |
| 9,956,677    | B2 | * | 5/2018  | Baskar ....................... B25F 3/00 |
| 2007/0228865 | A1 | * | 10/2007 | Roos ........................ H02K 3/28 310/198 |
| 2008/0001492 | A1 | * | 1/2008  | Cros ....................... H02K 23/30 310/233 |

(Continued)

FOREIGN PATENT DOCUMENTS

CN   102801270 A   11/2012

OTHER PUBLICATIONS

TDK, "ferrite magnets", Jun. 10, 2008.*

*Primary Examiner* — John K Kim

(74) *Attorney, Agent, or Firm* — Muncy, Geissler, Olds & Lowe, P.C.

(57) ABSTRACT

A low-voltage direct current motor has a stator and a rotor rotatable relative to the stator. The rotor includes a rotary shaft, a rotor core fixed to the shaft, a commutator fixed to the shaft adjacent to the rotor core, and rotor windings wound about poles of the rotor core and electrically connected to the commutator. The stator includes a round housing, a permanent magnet mounted to an inner surface of the housing, and brushes disposed in sliding contact with the commutator. An input voltage of the motor is in the range of 7 to 36V, and a ratio of an outer diameter of the rotor core to an outer diameter of the housing is in the range of 67% to 75%.

15 Claims, 4 Drawing Sheets

(56) References Cited

U.S. PATENT DOCUMENTS

| | | | | |
|---|---|---|---|---|
| 2008/0055764 | A1* | 3/2008 | Fujii | G11B 25/043 |
| | | | | 360/73.03 |
| 2008/0155768 | A1* | 7/2008 | Ziegler | A47L 5/14 |
| | | | | 15/4 |
| 2010/0013361 | A1* | 1/2010 | Zhao | H02K 23/30 |
| | | | | 310/40 MM |
| 2010/0176676 | A1* | 7/2010 | Uenishi | H02K 5/04 |
| | | | | 310/154.24 |
| 2012/0068566 | A1* | 3/2012 | Miyajima | H02K 23/04 |
| | | | | 310/154.22 |
| 2012/0194023 | A1* | 8/2012 | Lau | H02K 23/04 |
| | | | | 310/154.01 |
| 2014/0332243 | A1* | 11/2014 | Baskar | B25F 3/00 |
| | | | | 173/29 |
| 2015/0200535 | A1* | 7/2015 | Uesugi | H02J 7/0031 |
| | | | | 361/91.1 |
| 2016/0372981 | A1* | 12/2016 | Lu | H02K 1/02 |

* cited by examiner

LOW-VOLTAGE DIRECT CURRENT MOTOR

CROSS REFERENCE TO RELATED APPLICATIONS

This non-provisional patent application claims priority under 35 U.S.C. § 119(a) from Patent Application No. 201510345658.0 filed in The People's Republic of China on Jun. 19, 2015, and from Patent Application No. 201610244005.8 filed in The People's Republic of China on Apr. 19, 2016, the entire contents of which are hereby incorporated by reference.

FIELD OF THE INVENTION

This invention relates to a low-voltage direct current (DC) motor which is especially suitable for use in home appliances such as in a brush roller of a handheld vacuum cleaner.

BACKGROUND OF THE INVENTION

Many appliances and devices today use electric motors. It is desired for the electric motor for many devices, such as home appliances like handheld vacuum cleaners, to be smaller, lighter and more powerful so as to reduce the size of the appliance while offering the same performance or to increase the motor power to improve the performance of the appliance without increasing its size.

In a known home appliance a low voltage direct current motor is used. The low voltage direct current motor includes a stator and a rotor. The stator has a round housing and a permanent magnet fixed to an inner surface of the housing. The rotor includes a rotor core and rotor windings wound about poles of the rotor core. The rotor windings are supplied with low voltage direct current power. In a known 300 series low voltage direct current motor, the housing of the motor has an outer diameter of 27.6 mm, the rotor core has an outer diameter of 18 mm, and a ratio of the outer diameter of the rotor core to the outer diameter of the housing is 65.2%. When the input voltage of the motor is 16.2V, the rated power output of the motor is typically less than 30 watts.

SUMMARY OF THE INVENTION

Hence, there is a desire for a new low voltage direct current motor which can provide higher power output without increasing the size of its motor housing.

In one aspect, the present invention provides a low-voltage direct current motor which includes a stator and a rotor rotatable relative to the stator. The rotor includes a rotary shaft, a rotor core fixed to the shaft, a commutator fixed to the shaft adjacent to the rotor core, and rotor windings wound about poles of the rotor core and electrically connected to the commutator. The stator includes a round housing, a permanent magnet mounted to an inner surface of the housing, and brushes disposed in sliding contact with the commutator. An input voltage of the motor is in the range of 7 to 36V, and a ratio of an outer diameter of the rotor core to an outer diameter of the housing is in the range of 67% to 75%.

Preferably, the ratio of the outer diameter of the rotor core to the outer diameter of the housing is in the range of 67.6% to 73.8%.

Preferably, the permanent magnet is a ferrite magnet.

Preferably, the ferrite magnet is made of a material with a maximum energy product BHmax of $35.8 \pm 1.6$ kj/m$^3$.

Preferably, the ferrite magnet is made of a material with a residual magnetic flux density Br of $430 \pm 10$ mT, a coercive force Hcb of $318.5 \pm 7.9$ kA/m, and an intrinsic coercive force Hcj of $358.3 \pm 7.9$ kA/m.

Alternatively, the ferrite magnet is made of a material with a maximum energy product BHmax of $34.2 \pm 1.6$ kj/m$^3$.

Optionally, the ferrite magnet is made of a material with a residual magnetic flux density Br of $430 \pm 10$ mT, a coercive force Hcb of $258.7 \pm 7.9$ kA/m, and an intrinsic coercive force Hcj of $270.7 \pm 7.9$ kA/m.

Preferably, the outer diameter of the housing is 27.5 mm$\pm 0.3$ mm, and the outer diameter of the rotor core is 19 mm$\pm 0.2$ mm.

Preferably, when an axial length of the magnet is 21.0 mm$\pm 2.1$ mm, 27.5 mm$\pm 0.3$ mm, or 34 mm$\pm 0.3$ mm, and the motor is capable of achieving a rated power output of 20 W, 50 W, or 80 W, respectively.

Preferably, the rotor core has five or ten poles, the stator has two permanent magnetic poles, and the commutator has five commutator segments.

Optionally, a wire diameter of the rotor windings of the low-voltage direct current motor is in the range of 0.1 mm to 0.5 mm.

Preferably, a wire diameter of the rotor windings of the low-voltage direct current motor is in the range of 0.3 mm to 0.35 mm.

In another aspect, the present invention provides a brush roller of a vacuum cleaner, driven by the above low-voltage direct current motor.

In still another aspect, the present invention provides a home appliance including the above low-voltage direct current motor.

In the embodiment of the present invention described above, as higher-grade ferrite magnets are used, the magnets can be made thinner while ensuring sufficient magnetic performance so that the diameter of the rotor core can be increased. Therefore, the motor has more space for accommodating more rotor windings to achieve a higher power output. Furthermore, temperature rise during operation of the motor can be reduced as a larger thermal mass is provided, and copper loss of the motor may be reduced as thicker wire for the rotor windings is possible. In addition, in comparison with rare earth magnets, the ferrite magnets have a lower cost, which leads to a lower cost of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
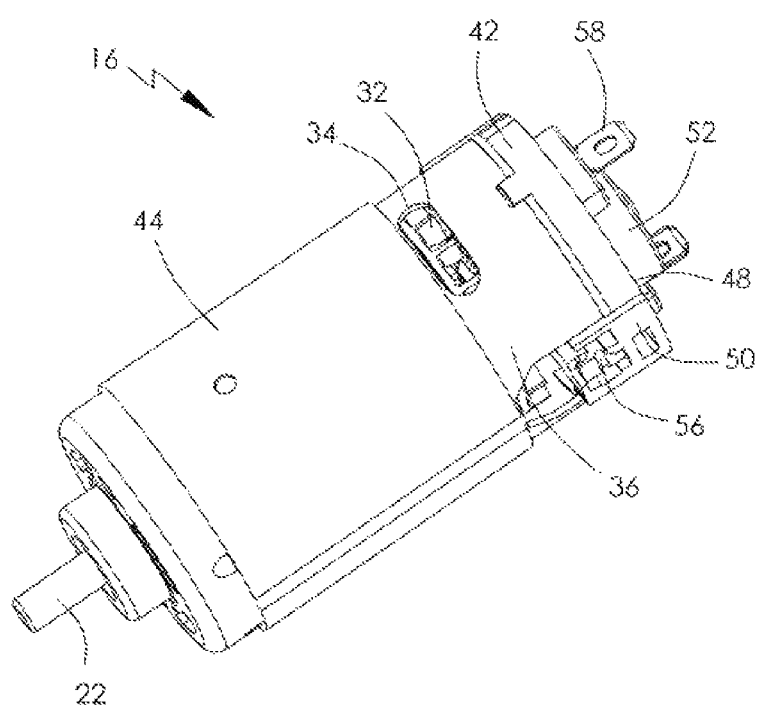
FIG. 1 illustrates a low-voltage direct current motor according to a preferred embodiment of the present invention.
Figure 2:
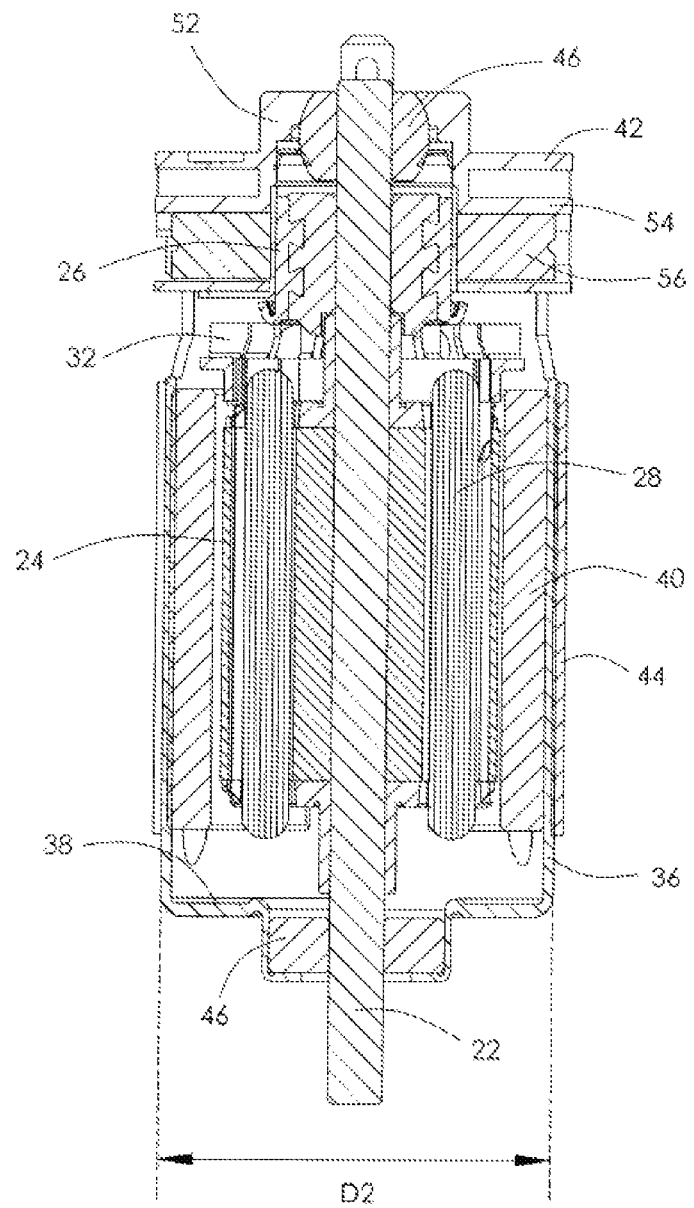
FIG. 2 is a sectional view of the motor of FIG. 1.
Figure 3:
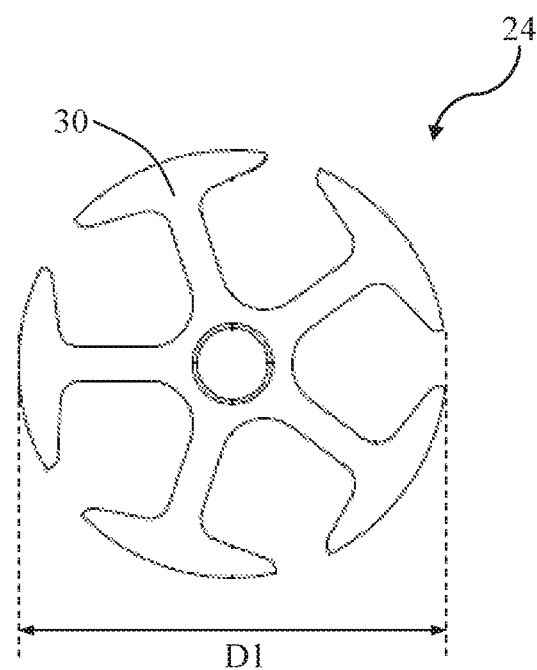
FIG. 3 illustrates a rotor core of the motor of FIG. 1.
Figure 4:
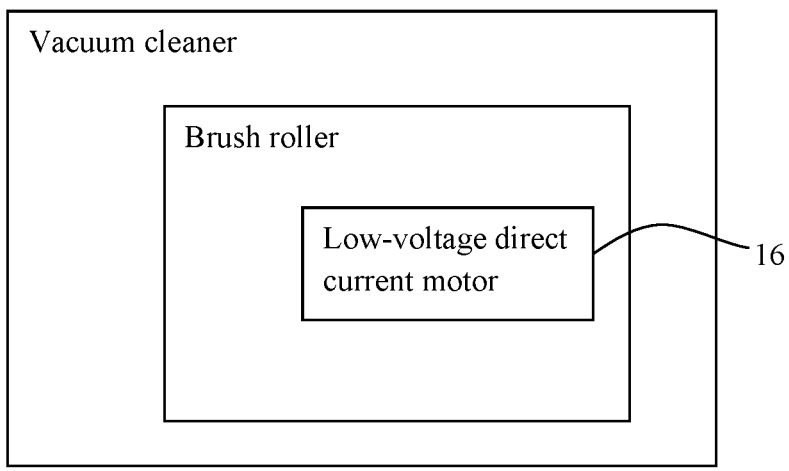
FIG. 4 illustrates the low-voltage direct current motor of FIG. 1 used in a brush roller of a vacuum cleaner.

FIG. 1 illustrates a low-voltage direct current motor 16 according to a preferred embodiment of the present invention. The low-voltage direct current motor 16 includes a stator and a rotor rotatable relative to the stator. The rotor includes a rotary shaft 22, a rotor core 24 fixed on the rotary shaft 22, a commutator 26 fixed on the rotary shaft 22 adjacent the rotor core 24, and rotor windings 28 wound about poles 30 of the rotor core 24 and electrically connected to the commutator 26. The rotor core 24 may be formed by a plurality of rotor core laminations stacked along an axial direction of the rotary shaft. Slots are formed between adjacent rotor poles 30 for accommodating the rotor windings 28. A fan 32 is fixed to the rotor core 24 and cooperates with openings 34 in a housing 36 of the motor to create airflow to cool the motor 16 when rotating. Preferably, the rotor core 24 has five poles, and the commutator has five commutator segments. In another embodiment, the rotor core 24 may have ten poles.

The stator includes an axially extending round housing 36 having an open end and a closed end 38, a permanent magnet 40 fixed to an inner surface of the housing 36, an end cap 42 closing the open end of the housing 36, and a pair of brush assemblies. The permanent magnet 40 forms two permanent magnetic poles. The housing 36 is made of a magnetic-conductive material. A flux ring 44 is fixed to an outer surface of the housing 36 to reduce the magnetic resistance of the flux return path of the housing 36. The end cap 42 is fixedly mounted to the housing 36. The rotary shaft 22 is rotatably supported by two bearings 46 respectively located on the end cap 42 and the closed end 38 of the housing. The rotor core 24 confronts the permanent magnet 40, with an air gap formed there between. The permanent magnet 40 may comprise a number of individual permanent magnet pieces. The preferred embodiment uses two permanent magnet pieces but one piece and four piece permanent magnet is also usable. Embodiments with more than four pieces are possible but not preferred due to assembly difficulties.

The end cap 42 includes a base plate 48, a ring-shaped sidewall 50 extending axially and inwardly from the base plate 48, and a bearing holder 52 extending axially and outwardly from the base plate 48 for holding one of the bearings 46. The sidewall 50 and the base plate 48 cooperatively define a chamber in which the commutator 16 may be received. Each brush assembly includes a brush cage 54. The brush cage 54 extends radially and inwardly from the sidewall 50 and is in commutation with the chamber. A brush 56 is slidably mounted in the brush cage 54 and is urged by a resilient member such as a spring (not shown) into sliding contact with the commutator 26. The end cap 42 is further provided with two electrical terminals 58 for electrically connecting to an external power supply. Each electrical terminal 58 is electrically connected to a corresponding one of the brushes 56 via a conductor (for example, a brush shunt not shown in the drawings). Thus, a low-voltage direct current power can be supplied to the rotor windings 28 via the electrical terminals 58, brushes 56 and the commutator 26.

In this embodiment, the permanent magnet 40 is made of higher-grade ferrite magnet, preferably a magnetic material with a maximum energy product (BHmax) of 35.8±1.6 kj/m$^3$, a residual magnetic flux density (Br) of 430±10 mT, a coercive force (Hcb) of 318.5±7.9 kA/m, and an intrinsic coercive force (Hcj) of 358.3±7.9 kA/m. In another preferred embodiment, the permanent magnets 40 are made of a ferrite magnet with a maximum energy product (BHmax) of 34.2±1.6 kj/m$^3$, a residual magnetic flux density (Br) of 430±10 mT, a coercive force (Hcb) of 258.7±7.9 kA/m, and an intrinsic coercive force (Hcj) of 270.7±7.9 kA/m. A ratio of an outer diameter of the rotor core 24 to an outer diameter of the housing of the motor is in the range of 67% to 75%.

In this embodiment, a wire diameter of the rotor windings is in the range of 0.1 mm to 0.5 mm, preferably 0.3 mm to 0.35 mm, and more preferably 0.32 mm.

In an example of a 300 series low-voltage direct current motor in accordance with the preferred embodiment of the present invention, the outer diameter D2 of the housing (excluding the thickness of the flux ring 44) is 27.5 mm±0.3 mm, and the outer diameter of the rotor core is 19 mm±0.2 mm. The ratio of the outer diameter of the rotor core 24 to the outer diameter of the housing is less than 71%.

In the embodiment of the present invention described above, as higher-grade ferrite magnets are used, the magnet pieces can be made thinner while ensuring sufficient magnetic performance so that the diameter of the rotor core can be increased. Therefore, the motor has more space for accommodating more rotor windings to achieve a higher power output. As several specific examples for the 300 series low-voltage direct current motor, when the input voltage of the motor is 16.2V±1.6V and the axial size of the magnet is 21.0 mm±2.1 mm, 27.5 mm±0.3 mm, and 34 mm±0.3 mm, respectively, the rated output power of the motor may be 20 W, 50 W, and 80 W, respectively.

Furthermore, temperature rise during operation of the motor can be reduced as a larger thermal mass is provided, and copper loss of the motor may be reduced as thicker wire for the rotor windings is possible. In addition, in comparison with rare earth magnets, the ferrite magnets have a lower cost, which leads to a lower cost of the motor.

The low-voltage direct current motor of the above embodiments of the present invention is especially suitable for use in home appliances such as for driving a brush roller of a handheld vacuum cleaner.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush roller for a vacuum cleaner, the brush roller being driven by a low-voltage direct current motor, the low-voltage direct current motor comprising:
   a stator comprising a round housing, a permanent magnet mounted to an inner surface of the housing, and brushes; and
   a rotor rotatable relative to the stator, the rotor comprising a shaft, a rotor core fixed to the shaft, a commutator fixed to the shaft adjacent to the rotor core, and rotor windings wound about poles of the rotor core and electrically connected to the commutator,
   wherein the brushes of the stator are disposed in sliding contact with the commutator, an input voltage of the motor is in the range of 7 to 36V, and a ratio of an outer diameter of the rotor core to an outer diameter of the housing is in the range of 67% to 75%, wherein the permanent magnet is a ferrite magnet made of a material with a maximum energy product BHmax of 35.8±1.6 kj/m³, and wherein the outer diameter of the housing is 27.5 mm±0.3 mm, and the outer diameter of the rotor core is 19 mm±0.2 mm, and wherein when an axial length of the magnet is 21.0 mm±2.1 mm, 27.5 mm±0.3 mm, or 34 mm±0.3 mm, the motor is capable of achieving a rated power output of 20 W, 50 W, or 80 W, respectively.

2. The brush roller of claim 1, wherein the ratio of the outer diameter of the rotor core to the outer diameter of the housing is in the range of 67.6% to 73.8%.

3. The brush roller of claim 1, wherein the permanent magnet is a ferrite magnet made of a material with a residual magnetic flux density Br of 430±10 mT, a coercive force Hcb of 318.5±7.9 kA/m, and an intrinsic coercive force Hcj of 358.3±7.9 kA/m.

4. The brush roller of claim 1, wherein the rotor core has five or ten poles, the stator has two permanent magnetic poles, and the commutator has five commutator segments.

5. The brush roller of claim 1, wherein a wire diameter of the rotor windings of the motor is in the range of 0.1 mm to 0.5 mm.

6. The brush roller of claim 1, wherein a wire diameter of the rotor windings of the motor is in the range of 0.3 mm to 0.35 mm.

7. The brush roller of claim 1, wherein the permanent magnet comprises a number of individual permanent magnet pieces.

8. A brush roller for a vacuum cleaner, the brush roller being driven by a low-voltage direct current motor, the low-voltage direct current motor comprising:
a stator comprising a round housing, a permanent magnet mounted to an inner surface of the housing, and brushes; and
a rotor rotatable relative to the stator, the rotor comprising a shaft, a rotor core fixed to the shaft, a commutator fixed to the shaft adjacent to the rotor core, and rotor windings wound about poles of the rotor core and electrically connected to the commutator,
wherein the brushes of the stator are disposed in sliding contact with the commutator, an input voltage of the motor is in the range of 7 to 36V, and a ratio of an outer diameter of the rotor core to an outer diameter of the housing is in the range of 67% to 75%, wherein the permanent magnet is a ferrite magnet made of a material with a maximum energy product BHmax of 34.2±1.6 kj/m³, and wherein the outer diameter of the housing is 27.5 mm±0.3 mm, and the outer diameter of the rotor core is 19 mm±0.2 mm, when an axial length of the magnet is 21.0 mm±2.1 mm, 27.5 mm±0.3 mm, or 34 mm±0.3 mm, the motor is capable of achieving a rated power output of 20 W, 50 W, or 80 W, respectively.

9. The brush roller of claim 8, wherein the ratio of the outer diameter of the rotor core to the outer diameter of the housing is in the range of 67.6% to 73.8%.

10. The brush roller of claim 8, wherein the permanent magnet is a ferrite magnet made of a material with a residual magnetic flux density Br of 430±10 mT, a coercive force Hcb of 258.7±7.9 kA/m, and an intrinsic coercive force Hcj of 270.7±7.9 kA/m.

11. The brush roller of claim 8, wherein the rotor core has five or ten poles, the stator has two permanent magnetic poles, and the commutator has five commutator segments.

12. The brush roller of claim 8, wherein a wire diameter of the rotor windings of the motor is in the range of 0.1 mm to 0.5 mm.

13. The brush roller of claim 8, wherein a wire diameter of the rotor windings of the motor is in the range of 0.3 mm to 0.35 mm.

14. The brush roller of claim 8, wherein the permanent magnet comprises a number of individual permanent magnet pieces.

15. A brush roller for a vacuum cleaner, the brush roller being driven by a low-voltage direct current motor, the low-voltage direct current motor comprising:
a stator comprising a round housing, a permanent magnet mounted to an inner surface of the housing, and brushes; and
a rotor rotatable relative to the stator, the rotor comprising a shaft, a rotor core fixed to the shaft, a commutator fixed to the shaft adjacent to the rotor core, and rotor windings wound about poles of the rotor core and electrically connected to the commutator,
wherein the brushes of the stator are disposed in sliding contact with the commutator, an input voltage of the motor is in the range of 7 to 36V, and a ratio of an outer diameter of the rotor core to an outer diameter of the housing is in the range of 67% to 75%, and wherein the outer diameter of the housing is 27.5 mm±0.3 mm, and the outer diameter of the rotor core is 19 mm±0.2 mm, and wherein the rotor core has five or ten poles, the stator has two permanent magnetic poles, and the commutator has five commutator segments.

* * * * *